(12) United States Patent
Field, III et al.

(10) Patent No.: US 12,218,512 B2
(45) Date of Patent: Feb. 4, 2025

(54) WIRELESS, ENERGY HARVESTER WITH MODULAR SENSOR SYSTEM

(71) Applicant: NANOFLEX POWER CORPORATION, Scottsdale, AZ (US)

(72) Inventors: Richard Field, III, Scottsdale, AZ (US); Adam Bariot, Scottsdale, AZ (US); Steven Wolgast, Scottsdale, AZ (US); Jeff King, Scottsdale, AZ (US); Norman J. Allen, Scottsdale, AZ (US)

( * ) Notice: Subject to any disclaimer, the term of this patent is extended or adjusted under 35 U.S.C. 154(b) by 118 days.

(21) Appl. No.: 17/807,227

(22) Filed: Jun. 16, 2022

(65) Prior Publication Data
US 2022/0311273 A1    Sep. 29, 2022

Related U.S. Application Data

(63) Continuation-in-part of application No. PCT/US2020/065282, filed on Dec. 16, 2020.
(Continued)

(51) Int. Cl.
| | |
|---|---|
| *H02J 50/00* | (2016.01) |
| *G01D 11/00* | (2006.01) |
| *G01D 11/24* | (2006.01) |
| *H01R 13/62* | (2006.01) |
| *H02J 7/00* | (2006.01) |
| *H02J 7/35* | (2006.01) |
| *H02S 40/36* | (2014.01) |

(52) U.S. Cl.
CPC ............ *H02J 50/001* (2020.01); *G01D 11/00* (2013.01); *G01D 11/24* (2013.01); *H01R 13/6205* (2013.01); *H02J 7/0042* (2013.01); *H02J 7/35* (2013.01); *H02J 50/005* (2020.01); *H02S 40/36* (2014.12)

(58) Field of Classification Search
CPC ...... H02J 50/001; H02J 50/005; H02J 7/0042; H02J 7/35; G01D 11/00; G01D 11/24; G01D 21/02; H01R 13/6205; H01R 13/2421; H02S 40/36; Y02B 10/10; Y02E 10/56
USPC ........ 307/11; 340/901, 933, 952, 988, 425.5, 340/426.19, 500, 501, 531, 539.22, 340/539.26, 578, 600, 632
See application file for complete search history.

(56) References Cited

U.S. PATENT DOCUMENTS

| | | |
|---|---|---|
| 6,792,259 B1 | 9/2004 | Parise |
| 7,068,991 B2 | 6/2006 | Parise |
| (Continued) | | |

OTHER PUBLICATIONS

International Search Report & Written Opinion dated Mar. 16, 2021, PCT/US2020/065282.

*Primary Examiner* — Arnold M Kinkead
(74) *Attorney, Agent, or Firm* — Finnegan, Henderson, Farabow, Garrett & Dunner, LLP

(57) ABSTRACT

A modular sensor system comprising a plurality of modules, the plurality of modules comprising one or more sensors, one or more energy harvesters, one or more energy storage devices, one or more wireless radios, and one or more electronics devices, wherein the one or more energy harvesters comprise a photovoltaic cell; and one or more blind-mate connectors contained within each of the plurality of modules, wherein the one or more blind-mate connectors comprise an electrical connector to transmit power and/or data and configured to connect two modules of the plurality of modules together.

22 Claims, 11 Drawing Sheets

Related U.S. Application Data

(60) Provisional application No. 62/948,709, filed on Dec. 16, 2019.

(56) References Cited

U.S. PATENT DOCUMENTS

| | | |
|---|---|---|
| 8,692,505 B2 | 4/2014 | Chu et al. |
| 10,950,118 B2 * | 3/2021 | Brown .................. G06V 20/52 |
| 2014/0362510 A1 | 12/2014 | Hirano et al. |
| 2016/0242232 A1 | 8/2016 | Deros |
| 2018/0290067 A1 | 10/2018 | Miller |

* cited by examiner

WIRELESS, ENERGY HARVESTER WITH MODULAR SENSOR SYSTEM

CROSS-REFERENCE TO RELATED APPLICATION

This is a bypass continuation-in-part of International Application No. PCT/US20/65282, filed Dec. 16, 2020, which claims the benefit of U.S. Provisional Application No. 62/948,709, filed Dec. 16, 2019, all of which are incorporated herein by reference in its entirety.

The present disclosure generally relates to modular sensor systems comprising at least one energy harvesting component.

The present disclosure is directed to modular sensor systems, which allow the user to provide customized sensor solutions. The disclosed system allows for easier custom sensor deployment through the use of a wireless system that contains wireless energy harvesting and wireless communication of sensor data. The system comprises modules to expand the sensor capability, allowing a potentially unlimited number of sensors to be added modularly. In addition, each module can contain any of a plurality of sensors, energy harvesters, energy storage devices, and/or wireless radios. The energy harvesters according to the present disclosure can increase the available energy for the device and/or extend the lifetime of the device over other prior art solutions, such as using batteries, capacitors, and/or supercapacitors.

These advantages, for example, promote more frequent or constant communication, and/or enable powering more electronics that use higher amounts of energy. In particular, the energy harvesters according to the present disclosure can be used to power high-power sensors and electronics. As used herein, high-power sensors and electronics refer to self-powered devices having a time-averaged power ranging from 1 mW to 1 W. The average power is determined by the power required to perform a task (e.g. make a measurement, perform a local computation, or transmit data) and the frequency of those tasks. Time-averaged power of greater than 1 mW can be reached from one or more of the following: (1) high-power sensors (e.g., visual, methane, or ammonia sensors), (2) high-power electronics (e.g., CPU GPU), (3) multiple low-power sensors (e.g., attachment of multiple sensor modules), and (4) taking data at increased frequency.

The energy harvesters according to the present disclosure have superior energy harvesting in indoor light thereby enabling powering more electronics that use more energy. The energy harvesters according to the present disclosure devices are smaller in size than traditional silicon-powered devices with similar energy harvesting, thereby facilitating the adoption of organic photovoltaic (OPV) powered devices into applications that require higher power. In addition, the higher power provided by the energy harvesters according to the present disclosure can also power several sensor module attachments attached to the hub at one time, enabling more data.

The devices disclosed herein could be used in downstream markets including, but not limited to, agriculture, indoor farming, ecology, livestock tracking, home automation, Internet of Things (IoT), artificial intelligence, recreation, wearable devices, smartphones, tablets, computers, watches, jewelry, energy infrastructure, medical monitoring devices and biomedical patches, retail, cold chain, food transport/packaging/storage/preparation/serving, logistics, air/land/water transportation, aerospace, shipping, asset tracking, location/movement/vibration monitoring, architecture, military, defense and surveillance, lidar, radar and remote sensing, modular power harvesting and/or radio device, building/home monitoring, tamper resistant monitoring, alert systems, automation, automotive, and building integrated photovoltaics.

In certain embodiments, the present disclosure is directed to a modular sensor system comprising a plurality of modules, the plurality of modules comprising one or more sensors, one or more energy harvesters, one or more energy storage devices, one or more wireless radios, and one or more electronics devices, wherein the one or more energy harvesters comprise a photovoltaic cell; and one or more blind-mate connectors contained within each of the plurality of modules, wherein the one or more blind-mate connectors comprise an electrical connector to transmit power and/or data and configured to connect two modules of the plurality of modules together.

In other embodiments, the present disclosure is directed to a modular sensor system comprising a plurality of modules, the plurality of modules comprising one or more sensors, one or more energy harvesters, one or more wireless radios, and one or more electronics devices, wherein the one or more energy harvesters comprise a photovoltaic cell; and one or more blind-mate connectors contained within each of the plurality of modules, wherein the one or more blind-mate connectors comprise an electrical connector to transmit power and/or data and configured to connect two modules of the plurality of modules together.

Other embodiments of the present disclosure are set forth below.

It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated in and constitute a part of this specification, illustrate several embodiments of the invention and together with the description, serve to explain the principles of the invention.

Figure 1:
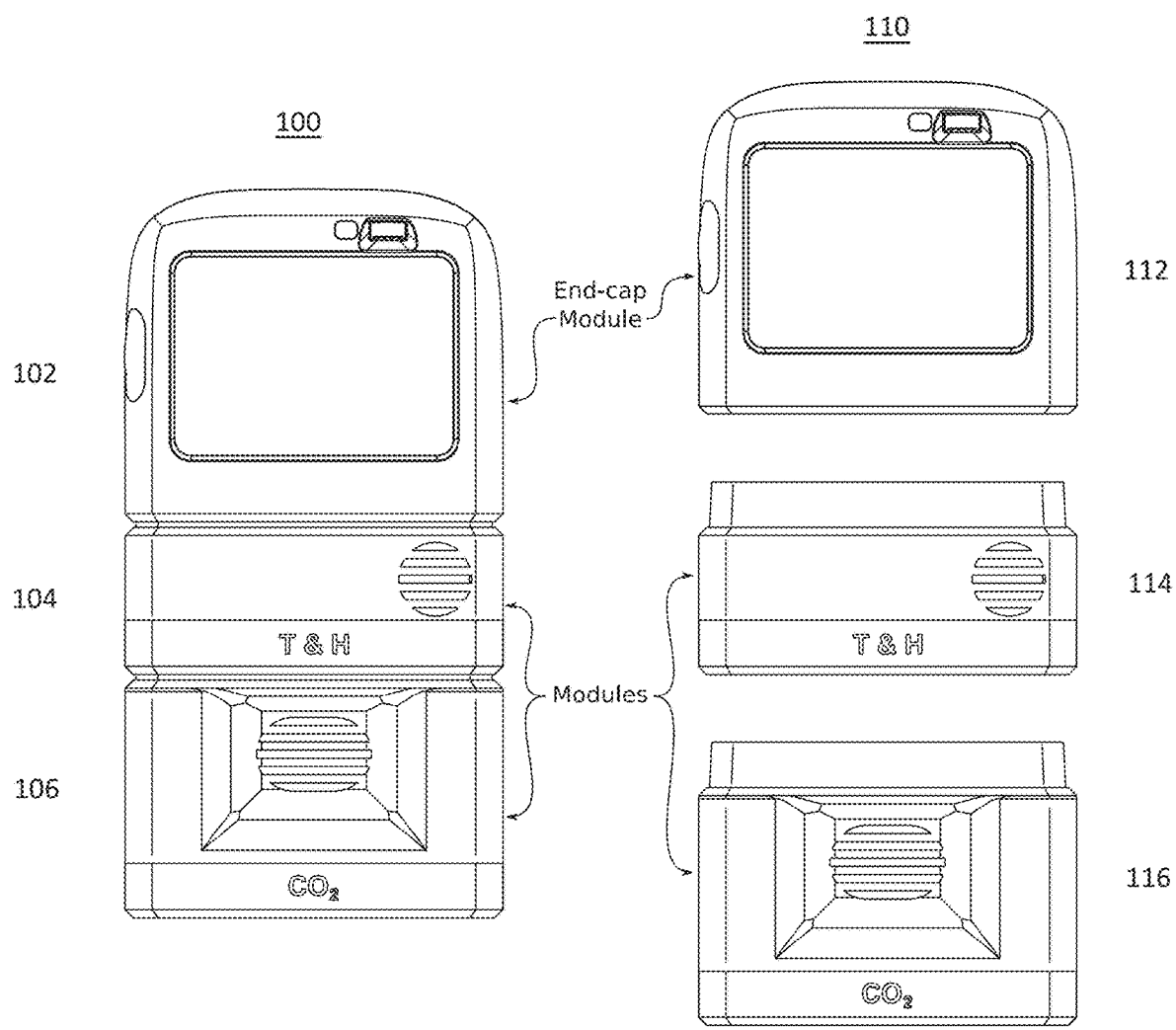
FIG. 1 is an illustration depicting an assembled view and an exploded view of an exemplary modular sensor system.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Certain embodiments of the present disclosure are directed to a modular sensor system comprising a plurality of modules, the plurality of modules comprising one or more sensors, one or more energy harvesters, one or more energy storage devices, one or more wireless radios, and one or more electronics devices, wherein the one or more energy harvesters comprise a photovoltaic cell; and one or more blind-mate connectors contained within each of the plurality of modules, wherein the one or more blind-mate connectors comprise an electrical connector to transmit power and/or data and configured to connect two modules of the plurality of modules together.

In certain embodiments, the one or more energy harvesters contained in the module are chosen from photovoltaic harvesters, piezoelectric harvesters, vibrational harvesters, thermoelectric harvesters, radio frequency (RF) harvesters, and inductive energy harvesters. In further embodiments, the photovoltaic harvesters contained in the module comprise one or more of organic photovoltaic (OPV) cells, perovskites, gallium arsenide (GaAs), copper indium gallium selenide (CIGS), cadmium telluride (CdTe), amorphous silicon, crystalline silicon, and polycrystalline silicon.

In certain embodiments, the photovoltaic harvester contained in the module is optimizable for levels of light, the levels of light ranging from 1 lux to 150,000 lux, by one or more of modifying the color of the cell, modifying the transparency of the cell, adding anti-reflective coatings, adding distributed Bragg reflectors, adding micro-patterning, adding a light-trapping structure, modifying the bandgap, adding junctions, and adding elements. In certain embodiments, the optimizable levels of light can range from 1 lux to 100 lux, from 100 lux to 1,000 lux, from 1,000 lux to 10,000 lux, from 500 lux to 2,000 lux, from 1,000 lux to 50,000 lux, from 10,000 lux to 50,000 lux, from 50,000 lux to 140,000 lux, and from 100,000 lux to 130,000 lux.

While the finished module is rigid, the photovoltaic energy harvester in the plurality of modules can be flexible or rigid. In certain embodiments, when the photovoltaic energy harvester in the plurality of modules is flexible, it can be made rigid by adherence to a rigid substrate, such as glass or plastic.

In other embodiments, the energy storage devices can comprise one or more of batteries, capacitors, and supercapacitors.

In certain embodiments, the one or more blind-mate connectors can attach the plurality of modules together utilizing at least one attaching mechanism chosen from magnets, mechanical clips, screwing, snapping, binding posts, adhesives, press fits, friction fits, screw locking, toggle connectors, bayonet connectors, banana connectors, and combinations thereof. In certain embodiments, the attaching mechanism can serve as the electrical connector.

In further embodiments, the attaching mechanism can comprise at least one pair of magnets, and a polarity of the at least one pair of magnets is reversed such that each module of the plurality of modules is connected in a correct orientation. In other embodiments, the attaching mechanism can comprise at least one magnet serving as a rear magnetic mount such that all magnetic orientations work for ferromagnetic surfaces. In additional embodiments, the attaching mechanism can comprises at least one pair of magnets, and a polarity of the at least one pair of magnets is matching, allowing the at least one pair of magnets to serve as a rear magnetic mount to magnetically polarized objects and ferromagnetic surfaces.

In certain embodiments of the present disclosure, the one or more blind-mate connectors comprise a shroud to prevent a sideways shear force from severing a connection between two modules from the plurality of modules. The shroud can comprise the electrical connector.

In the modular sensor system disclosed herein, one of the modules can be an end cap module, wherein the end cap module can be disposed on one end of the modular sensor system and preventing water ingress. The end cap module functions to protect a mating blind-mate connector and the electrical connector from water moisture and physical damage. In some embodiments, the end cap serves as a stand-alone charger for the modular sensor system.

In certain embodiments of the modular sensor system disclosed herein, each of the plurality of modules comprises a pass-through for data, power, or both data and power to travel between modules.

In certain embodiments of the modular sensor system disclosed herein, at least one module of the plurality of modules adds power to the system through the use of a wall power adapter or one or more replaceable batteries.

In further embodiments of the disclosed modular sensor system, one or more modules of the plurality of modules are water resistant or waterproof.

Additional embodiments of the modular sensor system comprise one or more modules having at least one chamber open to the environment, which can facilitate sensor response. In further embodiments, the at least one chamber open to the environment comprises one or more porous, hydrophobic films, which films can allow air penetration for sensing while keeping water and moisture out. Examples of such films include one or more of polyethylene terephthalate, polytetrafluoroethylene expanded polytetrafluoroethylene, polyolefin, polyvinylidene fluoride, polyester track-etch, polyvinyl chloride, cellulose nitrate, cellulose acetate, and surface-modified hydrophilic materials.

In additional embodiments, one or more modules of the plurality of modules are designed to promote at least one of (1) accurate temperature readings when placed in sunlight or other bright lights and (2) accurate air temperature readings when adhering the module to a wall or other surface by one or more of:
  (a) placing a temperature sensor on a printed circuit board stalk to minimize thermal transfer of heat between the temperature sensor and the casing of the module and between the temperature sensor and the bulk of the printed circuit board;
  (b) turning on a fan to promote air flow over the temperature sensor;
  (c) placing a shield or shade over the one or more modules or the temperature sensor such that the one or more modules or the temperature sensor are not in direct sunlight or other bright lights; and (d) mounting the modules to a wall or other surface using a stand-off to minimize thermal contact of the modules to the wall or other surface.

In certain embodiments of the disclosed modular sensor system the electrical connector can comprise one or more of spring-loaded (pogo pin) connectors, audio connectors, video connectors, banana connectors, barrel connectors, blade connectors, direct current (DC) connectors, Deutsches Institut für Normung (DIN) connectors, Dock connectors, D-sub connectors, edge connectors, Japan Solderless Terminal (JST) connectors, mini-din connectors, optical fiber connectors, phone connectors, pin headers, Radio Corporation of America (RCA) connectors, registered jack (RJ-XX) connectors, Universal Serial Bus (USB) connectors, USB-C connectors, micro USB connectors, circular connectors, rectangular connectors, hybrid connectors, crown spring connectors, modular jack connectors, connectors using a Secure Digital (SD) card port, connectors using a microSD card port, and an attaching mechanism of the blind-mate connector.

In certain embodiments, the modular sensor systems disclosed herein comprise one or more sensors for humidity, $CO_2$, lux, PAR, vapor pressure deficit, heat index, water, pH, soil moisture, volumetric soil moisture content, soil pH, accelerometer, temperature, pressure, gas sensing, global positioning system (GPS), ultra-wide band (UWB), trilateration, parametric sensing, CO, oxygen, total volatile organic compounds, chemical, contaminants, conductivity, resistivity, current sensing, current measuring, electrical activity, metal detecting, evapotranspiration, water usage, salinity, pest control, climate monitoring, stem diameters, radiation, rain, snow, wind, lightning, soil nutrients, dew point, leaf wetness, occupancy, position, status, smoke, fluid leaks, power failure, total dissolved solids, flood, motion, door motion, window motion, photogate, touch, Haptic, displacement, level, acoustic, sound, vibration, frequency, air flow, Hall effect, fuel level, fluid level, lidar, radar, torque, speed, tire pressure, chemicals, infrared, ozone, magnetic, radio direction finder, air pollution, moisture detection, seismometer, airspeed, depth, altimeter, freefall, position, angular rate, shock, tilt, velocity, inertial, force, stress, strain, weight, flame, proximity, presence, stretch, heartbeat, heart rate, blood glucose, blood oxygen, insulin, body temperature, medical chemical detection, blood pressure, sleep monitoring, respiration rate, lactic acid, hydration, cholesterol, electrocardiogram, electroencephalogram, electromyogram, hemoglobin, and anemia.

In certain embodiments, the modular sensor systems disclosed herein comprise one or more visual sensors. In further embodiments, the modular sensor systems disclosed herein comprise one or more electronics devices chosen from cameras (visual, infrared, hyperspectral), LIDAR (Light Detection and Ranging), and RADAR (Radio Detection and Ranging). In certain embodiments, the camera may take still images and/or video in low and/or high resolution.

Further embodiments of the present disclosure are directed to a modular sensor system comprising a plurality of modules, the plurality of modules comprising one or more sensors, wherein at least one of the modules contain one or more high-power sensors or electronics, one or more energy harvesters, one or more energy storage devices, one or more wireless radios, and one or more electronics devices, wherein the one or more energy harvesters comprise a photovoltaic cell; one or more blind-mate connectors contained within each of the plurality of modules, the one or more blind-mate connectors comprising an electrical connector to transmit power and/or data and configured to connect two modules of the plurality of modules together.

In certain embodiments, the modular sensor systems disclosed herein comprise one or more gas sensors. In further embodiments, the modular sensor systems disclosed herein comprise one or more energy-intensive gas sensors, such as ammonia sensors and methane sensors.

In certain embodiments, the modular sensor systems disclosed herein comprise one or more electronic devices. In further embodiments, the modular sensor systems disclosed herein comprise one or more onboard processors such as Central Processing Units (CPUs) and Graphics Processing Units (GPUs), which can be used for edge-computing.

In additional embodiments, the modular sensor systems disclosed herein comprise one or more electronics devices chosen from batteries, supercapacitors, thermoelectric devices, light-emitting devices, LEDs, power management chips, logic circuits, microprocessors, microcontrollers, integrated circuits, fans, resistors, capacitors, transistors, inductors, diodes, semiconductors, optoelectronic devices, memristors, micro-electromechanical systems (MEMS) devices, varistors, antennas, transducers, crystals, resonators, terminals, optical detectors, optical emitters, heaters, circuit breakers, fuses, relays, spark gaps, heat sinks, motors, displays, liquid crystal displays (LCD), light-emitting diode displays (LED), microLED, electroluminescent displays (ELD), electrophoretic displays (EPD), active matrix organic light-emitting diode displays (AMOLED), organic light-emitting diode displays (OLED), quantum dot displays (QD), quantum light-emitting diode displays (QLED), vacuum fluorescent displays (VFD), digital light processing displays (DLP), interferometric modulator displays (IMOD), digital microshutter displays (DMS), plasma displays, neon displays, filament displays, surface-conduction electron-emitter displays (SED), field emission displays (FED), Laser TV, carbon nanotube displays, touch screens, external connectors, data storage, piezo devices, speakers, microphones, security chips, and user input controls including buttons, knobs, sliders, switches, joysticks, directional-pads, keypads, and pressure/touch sensors.

In certain embodiments, the sensor system electronics according to the present disclosure are designed and optimized for minimal power consumption, including power management algorithms to control the frequency of data collection based on the available light. For example, temperature readings or camera images can be taken more frequently at higher light/lux levels.

In certain embodiments, the sensors and electronics are high power sensors and electronics with an averaged power ranging from 1 mW to 1 W. Non-limiting exemplary ranges of average power values include, for example, 1 mW to 5 mW. 1 mW to 10 mW, 1 mW to 25 mW, 1 mW to 50 mW, 1 mW to 100 mW, 1 mW to 250 mW, 1 mW to 500 mW, 1 mW to 750 mW, 3 mW to 5 mW, 3 mW to 10 mW, 3 mW to 25 mW, 3 mW to 50 mW, 3 mW to 100 mW, 3 mW to 250 mW, 3 mW to 500 mW, 3 mW to 750 mW, 3 mW to 1 W, 5 mW to 10 mW, 5 mW to 25 mW, 5 mW to 50 mW, 5 mW to 100 mW, 5 mW to 250 mW, 5 mW to 500 mW, 5 mW to 750 mW, 5 mW to 1 W, 10 mW to 50 mW, 10 mW to 100 mW, 10 mW to 250 mW, 10 mW to 500 mW, 10 mW to 750 mW, 10 mW to 1 W, 25 mW to 50 mW, 25 mW to 100 mW, 25 mW to 250 mW, 25 mW to 500 mW, 25 mW to 750 mW, 25 mW to 1 W, 50 mW to 100 mW, 50 mW to 250 mW, 50 mW to 500 mW, 50 mW to 750 mW, 50 mW to 1 W, 100 mW to 250 mW, 100 mW to 500 mW, 100 mW to 750 mW, 100 mW to 1 W, 250 mW to 500 mW, 250 mW to 750 mW, 250 mW to 1 W, 500 mW to 750 mW, 500 mW to 1 W, and 750 mW to 1 W. In particular embodiments, the high-power sensor can be a camera with an averaged power ranging from 1 mW to 10 mW, such as from 3 mW to 5 mW, 3 mW to 10 mW, and 5 mW to 10 mW. Non-limiting examples of cameras include visual cameras, infrared cameras, and hyperspectral cameras. In other particular embodiments, the sensor can be a sensor, such as a chemical sensor or a gas sensor, for example a methane sensor, with an averaged power ranging from 100 mW to 500 mW, such as from 100 mW to 250 mW, and 250 mW to 500 mW. In further embodiments, a combination of a camera and a sensor can be employed.

In certain embodiments, the modular sensor systems disclosed herein comprise one or more wireless radios configured for one or more of Bluetooth, Bluetooth Low Energy (BLE), BLE mesh, Long-Term Evolution (LTE), Wireless-Fidelity (Wi-Fi), Worldwide Interoperability for Microwave Access (WiMAX), WiFi-ah, WiFi HaLow, 802.11, 802.11a, 802.11b, 802.11g, Long Range (LoRa), Long Range Wide Area Network (LoRaWAN), Low Power Wide Area Networks (LPWANs), Zonal Intercommunication Global-standard (ZigBee), Z-Wave, 6LowPAN, Thread, Ultra-wideband (UWB), Infrared (IR), Infrared Data Association (IrDA), Narrowband Internet of Things (NB-IoT), Near Field Communication (NFC), radio frequency (RF), radio frequency identification (RFID), SigFox, Ingenu, Weightless-N, Weightless-P, Weightless-W, Advanced Network Technology (ANT), ANT+, DigiMesh, MiWi, EnOcean, Dash7, WirelessHART, General Packet Radio Service (GPRS), Global Systems for Mobile Communications (GSM), Extended Coverage Global Systems for Mobile Communications (EC-GSM), MYTHINGS, Metering Bus (M-bus), Konnex (KNX), and Industrial, Scientific, and Medical band (ISM-band) radios.

In certain embodiments, the sensors disclosed herein will wirelessly transmit data to a gateway, which will then connect to the internet, including cloud-based applications, thereby creating an Internet of Things system. Any of the wireless protocols disclosed herein can be used can be used to create such an IoT system.

In certain embodiments, the gateway can connect to browsers and apps directly through a local network both when with internet is connected or when the internet is down, achieving uninterrupted service with continued user control.

In certain embodiments, the modular sensor systems disclosed herein comprise one or more energy harvesters. Nonlimiting examples of such energy harvesters include organic photovoltaic (OPV) modules, wherein the OPV modules can be optimizable for any light spectrum. For example, the OPV modules can be optimized for a light spectrum by increasing or decreasing device layer thickness, choosing photoactive materials based on their spectral absorption properties, varying the ratio of photoactive materials, adding or removing layers and junctions, varying the bandgap of an individual junction, and applying one or more of anti-reflective coatings, distributed Bragg reflectors, micro-patterning, and/or light-trapping structures. In certain embodiments, the OPV modules are optimized for indoor light.

Depending on application specifications, the OPV modules can be manufactured to be semi-transparent, highly reflective, or opaque. Semi-transparent OPV modules can be achieved through using semi-transparent conductive materials (such as indium tin oxide or thin metal) for both top and bottom electrodes. Reflectivity and hue can be controlled via organic material selection and thickness of the organic layers in the OPV module.

In certain embodiments, the OPV modules comprise polymers and/or organic molecules (including pure carbon compounds) as the photo-active materials. Polymer-based and/or organic molecules based OPV modules are solution-processed, requiring carrier solvents and methods such as but not limited to blade-coating, spin-coating, and printing. Some small molecule OPV modules can also be manufactured through vacuum deposition. Further embodiments of the present disclosure are directed to OPV modules manufactured using small molecule materials deposited via vacuum thermal evaporation, organic vapor jet printing, or organic vapor phase deposition.

The OPV modules may be optimized for any light spectrum, such as sunlight or indoor light, for example, LED (light-emitting diode), fluorescent, incandescent, grow lights, neon lights, mercury vapor, metal halide, high-intensity discharge, bioluminescent, and chemiluminescent, to increase the energy harvesting from solar for a target spectrum. For a given light spectrum, the optimization could target a specific level of light, ranging from 1 lux to 150,000 lux. Non-limiting exemplary ranges of optimized levels of light include, for example: 100 lux to 1,000 lux for indoor applications using artificial light sources; 100 lux to 75,000 lux for indoor agriculture applications, such as 5,000 lux to 7,000 lux for seedlings and 15,000 lux to 75,000 lux for vegetative growth; 1,000 lux to 30,000 lux for cloudy outside applications, and 100,000 lux to 140,000 lux for bright sunlight applications.

In certain embodiments, the OPV modules can be optimized for artificial light sources in order to harvest most light in the low-light environments. In such embodiments, there will be enough light to power the device when brought outside even though the OPV module is not optimized for outdoor light.

For example, the OPV modules can be highly tunable to the light spectrum in varying applications. Internally, color and transparency of OPVs can be tuned by increasing or decreasing device layers thicknesses, choosing photoactive materials based on their spectral absorption properties, varying the ratio of photoactive materials, and adding/removing layers and/or junctions. Externally, the OPV modules can be tuned to a specific light spectrum using anti-reflective coatings, distributed Bragg reflectors, micro-patterning, and other light-trapping structures.

In general, photovoltaic cells are engineered such that their absorption spectrum will accept the emission spectrum of the light source. Tuning can occur by varying the bandgap of an individual junction (or sub-cell), or by adding multiple junctions (or sub-cells) to the devices such that the combined absorption spectrum of the solar cell is matched to the light source—thereby increasing the photovoltaic efficiency. For example, elements can be added to the base solar cell (e.g., adding N to GaAs) to adjust the bandgap.

In other embodiments, the modular sensor systems disclosed herein comprise one or more energy harvesters chosen from silicon photovoltaic modules. In certain embodiments, the silicon photovoltaic modules are chosen from crystalline silicon photovoltaic modules, polycrystalline silicon photovoltaic modules, and amorphous silicon photovoltaic modules such as thin film photovoltaic modules.

In certain embodiments, the modular sensor systems disclosed herein, which enable large amounts of data to be generated and captured, can be used in Artificial Intelligence applications. In these embodiments, camera and sensory data can provide feedback to create, validate, and update machine learning algorithms, and use the Artificial Intelligence algorithms for monitoring and optimized automation routines for any of the listed downstream applications provided herein. According to these embodiments, the data is sent to a wireless gateway. In certain embodiments, once the data is sent to a wireless gateway, the data is then processed on the gateway and/or on a cloud-based processor.

In addition, the higher power provided by the energy harvesters according to the present disclosure can also power several sensor module attachments attached to the hub at one time. In addition, the wireless sensors according to the present disclosure also facilitate the installation process of sensors since no permanent wires need to be run for power or data to the sensors. The wireless sensors are more reliable than battery-powered wireless sensors which require recurring maintenance to monitor and change batteries and can be unreliable since sensors with low and/or dead batteries do not function. In indoor agriculture, for example, this can lead to crops growing outside their optimal ranges decreasing crop yield. The easy installation and extra reliability of the wireless sensors disclosed herein greatly facilitates the installation of many sensors throughout a facility since the sensors can simply placed without any need for battery monitoring and change. Installation of many sensors can be used for precise monitoring and control of micro-climates within a farm, and also can provide more data to drive Artificial Intelligence.

In other embodiments, the modular sensor systems disclosed herein can be used in home automation and Internet of things applications, in which sensors can be used to monitor temperature, light (intensity and/or color), motion, humidity, position (e.g. window open/closed), CO, fire, leak, moisture, and other sensors to trigger an automated task such as, for example, turning on or off lights, air conditioning, fans, heating, alarms, cameras and/or mobile alerts.

In further embodiments, the modular sensor systems disclosed herein are used in agricultural applications, including both indoor and outdoor applications. In such applications, the sensors are used, for example, to monitor temperature, humidity, light levels (e.g., Lux or PAR), soil moisture, volumetric soil moisture content, soil nutrients, soil pH, water pH, air quality (e.g., total volatile organic compounds), air flow, rainfall, wind speed, dew point, atmospheric pressure, and leaf wetness.

In additional embodiments, the modular sensor systems disclosed herein are used in cold chain management, in which sensors and/or beacons can be used to monitor the cold transport of food, medical supplies/vaccines, etc., by measuring temperature, humidity, light, location (e.g., GPS) and/proximity (e.g., BLE trilateration, LoRa trilateration, ISM band trilateration).

Further embodiments use the modular sensor systems disclosed herein in food transport/packaging/storage/preparation/serving, in which sensors and/or beacons can be used to monitor temperature, humidity, light, location (e.g., GPS) and/proximity (e.g., BLE trilateration, LoRa trilateration, ISM band trilateration).

Additional embodiments of the present disclosure use sensors and/or beacons disclosed herein to monitor temperature, humidity, light levels, proximity, etc., integrated with smart home automation. In addition, the present disclosure contemplates the disclosed sensors triggering automation and alerts, from any of the sensors listed here including, for example, climate control for agriculture or buildings, or turning fans on if a methane leak is detected.

Moreover, the disclosed modular sensor systems can be used in asset tracking, in which sensors and/or beacons can be used to monitor location (e.g., GPS) and/proximity (e.g., BLE trilateration, LoRa trilateration, ISM band trilateration).

In certain embodiments, the modular sensor systems disclosed herein comprise one or more visual sensors such as, for example, cameras. In certain embodiments, the cameras can be visual, infrared, or hyperspectral and, in further, the camera can take still images and/or video in low and/or high resolution. In certain embodiments, the visual sensors can be used to monitor, for example, plant color, plant size, plant shape, plant density, and plant growth.

In some embodiments, the electronics device will be a sensor to monitor conditions such as but not limited to humidity, $CO_2$, lux, PAR, vapor pressure deficit, heat index, water pH, soil moisture, volumetric soil moisture content, soil pH, accelerometer, temperature, pressure, gas sensing such as ammonia and methane, GPS, UWB (ultra-wide band) trilateration, parametric sensing, CO, oxygen, total volatile organic compounds, chemical, contaminants, conductivity, resistivity, current sensing/measuring, electrical activity, metal detecting, evapotranspiration, water usage, salinity, pest control, climate monitoring, stem diameters, radiation, rain, snow, wind, lightning, soil nutrients, dew point, leaf wetness, occupancy, position/status, smoke, fluid leaks, power failure, total dissolved solids, flood, motion, door/window motion, photogate, touch, Haptic, displacement, level, acoustic/sound/vibration/frequency, airflow, Hall effect, fuel level, fluid level, lidar, radar, torque, speed, tire pressure, chemicals, infrared, ozone, magnetic, radio direction finder, air pollution, moisture detection, seismometer, airspeed, depth, altimeter, freefall, position, angular rate, shock, tilt, velocity, inertial, force, stress, strain, weight, flame, proximity/presence, stretch, heartbeat, heart rate, blood glucose, blood oxygen, insulin, body temperature, medical chemical detection, blood pressure, sleep monitoring, respiration rate, lactic acid, hydration, cholesterol, electrocardiogram, electroencephalogram, electromyogram, hemoglobin, and anemia.

Additional embodiments of the present disclosure are directed to a modular sensor system comprising a plurality of modules, the plurality of modules comprising one or more sensors, one or more energy harvesters, one or more wireless radios, and one or more electronics devices, wherein the one or more energy harvesters comprise a photovoltaic cell; and one or more blind-mate connectors contained within each of the plurality of modules, wherein the one or more blind-mate connectors comprise an electrical connector to transmit power and/or data and configured to connect two modules of the plurality of modules together.

Further embodiments of the present disclosure are directed to a modular sensor system comprising a plurality of modules, the plurality of modules comprising:
 one or more sensors chosen from sensors for humidity, CO2, lux, PAR, vapor pressure deficit, heat index, water, pH, soil moisture, volumetric soil moisture content, soil pH, accelerometer, temperature, pressure, gas sensing such as ammonia and methane, global positioning system (GPS), ultra-wide band (UWB), trilateration, parametric sensing, CO, oxygen, total volatile organic compounds, chemical, contaminants, conductivity, resistivity, current sensing, current measuring, electrical activity, metal detecting, evapotranspiration, water usage, salinity, pest control, climate monitoring, stem diameters, radiation, rain, snow, wind, lightning, soil nutrients, dew point, leaf wetness, occupancy, position, status, smoke, fluid leaks, power failure, total dissolved solids, flood, motion, door motion, window motion, photogate, touch, Haptic, displacement, level, acoustic, sound, vibration, frequency, air flow, Hall effect, fuel level, fluid level, lidar, radar, torque, speed, tire pressure, chemicals, infrared, ozone, magnetic, radio direction finder, air pollution, moisture detection, seismometer, airspeed, depth, altimeter, freefall, position, angular rate, shock, tilt, velocity, inertial, force, stress, strain, weight, flame, proximity, presence, stretch, heartbeat, heart rate, blood glucose, blood oxygen, insulin, body temperature, medical chemical detection, blood pressure, sleep monitoring, respiration rate, lactic acid, hydration, cholesterol, electrocardiogram, electroencephalogram, electromyogram, hemoglobin, and anemia;

one or more photovoltaic harvesters;

one or more wireless radios configured for one or more of Bluetooth, Bluetooth Low Energy (BLE), BLE mesh, Long-Term Evolution (LTE), Wireless-Fidelity (Wi-Fi), Worldwide Interoperability for Microwave Access (WiMAX), WiFi-ah, WiFi HaLow, 802.11, 802.11a, 802.11b, 802.11g, Long Range (LoRa), Long Range Wide Area Network (LoRaWAN), Low Power Wide Area Networks (LPWANs), Zonal Intercommunication Global-standard (ZigBee), Z-Wave, 6LowPAN, Thread, Ultra-wideband (UWB), Infrared (IR), Infrared Data Association (IrDA), Narrowband Internet of Things (NB-IoT), Near Field Communication (NFC), radio frequency (RF), radio frequency identification (RFID), SigFox, Ingenu, Weightless-N, Weightless-P, Weightless-W, Advanced Network Technology (ANT), ANT+, DigiMesh, MiWi, EnOcean, Dash7, WirelessHART, General Packet Radio Service (GPRS), Global Systems for Mobile Communications (GSM), Extended Coverage Global Systems for Mobile Communications (EC-GSM), MYTHINGS, Metering Bus (M-bus), Konnex (KNX), and Industrial, Scientific, and Medical band (ISM-band) radios;

one or more electronics devices chosen from batteries, supercapacitors, onboard processors such as Central Processing Units (CPUs) and Graphics Processing Units (GPUs), cameras such as visual, infrared, and hyperspectral, thermoelectric devices, light-emitting devices, LEDs, power management chips, logic circuits, microprocessors, microcontrollers, integrated circuits, fans, resistors, capacitors, transistors, inductors, diodes, semiconductors, optoelectronic devices, memristors, micro-electromechanical systems (MEMS) devices, varistors, antennas, transducers, crystals, resonators, terminals, optical detectors, optical emitters, heaters, circuit breakers, fuses, relays, spark gaps, heat sinks, motors, displays, liquid crystal displays (LCD), light-emitting diode displays (LED), microLED, electroluminescent displays (ELD), electrophoretic displays (EPD), active matrix organic light-emitting diode displays (AMOLED), organic light-emitting diode displays (OLED), quantum dot displays (QD), quantum light-emitting diode displays (QLED), vacuum fluorescent displays (VFD), digital light processing displays (DLP), interferometric modulator displays (IMOD), digital microshutter displays (DMS), plasma displays, neon displays, filament displays, surface-conduction electron-emitter displays (SED), field emission displays (FED), Laser TV, carbon nanotube displays, touch screens, external connectors, data storage, piezo devices, speakers, microphones, security chips, and user input controls including buttons, knobs, sliders, switches, joysticks, directional-pads, keypads, and pressure/touch sensors; and and one or more blind-mate connectors contained within each of the plurality of modules, wherein the one or more blind-mate connectors comprise an electrical connector to transmit power and/or data and configured to connect two modules of the plurality of modules together.

FIG. 1 is an illustration depicting an assembled view and an exploded view of an exemplary modular sensor system. As depicted, modular sensor system 100 may include an end cap module 102, a temperature and humidity module 104, and a $CO_2$ module 106. Similarly, exploded modular sensor system 110 may include an end cap module 112, a temperature and humidity module 114, and a $CO_2$ module 116. Modules 102, 104, and 106 and modules 112, 114, and 116 may be connected such that power and data may be transmitted and are held together by one or more blind-mate connectors, as described in greater detail below.

Modular sensor systems 100 and 110 may consist of a plurality of modules which may be modularly combined in a plurality of combinations. The modules may be selected from a plurality of available modules, such that not all modules need be used and a custom sensor solution may be realized. Each module may include any of a plurality of sensors, energy harvesters, energy storage devices, wireless radios, and/or electronics devices.

For example, in FIG. 1, modular sensor system 100 includes temperature and humidity module 104 which includes a temperature sensor and a humidity sensor, $CO_2$ module 106 which includes a $CO_2$ sensor, and end cap module 102 which includes a temperature sensor and a light sensor. In other embodiments, end cap module 102 includes only a temperature sensor, only a light sensor, neither, or other sensors. Further, end cap module 102 may also include energy harvesters, such as a photovoltaic cell, energy storage devices, such as rechargeable batteries, wireless radios, and/or electronics devices, such as power management circuitry, a microprocessor, LEDs, and/or push buttons.

In some embodiments, each of the plurality of modules may include a pass-through for data and/or power to travel between modules. In other embodiments, a module of the plurality of modules may add power to modular sensor system 100 by means of a wall power adapter or one or more replaceable batteries. This may supplement power generation from an energy harvester. For example, if a modular sensor system relies on photovoltaic cells for energy harvesting, but a user wishes to place this system in a dark space, the user may use a module which may be plugged in to an external power source to power the system.

In yet other embodiments, one or more modules may include at least one chamber open to the environment to facilitate sensor response. For example, in FIG. 1, temperature and humidity module 104 and $CO_2$ module 106 include an open chamber to allow airflow to take fast and accurate readings. In some embodiments, open chambers may include porous, hydrophobic films to allow air penetration for sensing while keeping water and moisture out. The films may be any of a plurality of films, such as but not limited to polyethylene terephthalate, polytetrafluoroethylene expanded polytetrafluoroethylene, polyolefin (e.g. polypropylene and polyethylene), polyvinylidene fluoride, polyester track-etch, polyvinyl chloride, cellulose nitrate, cellulose acetate, and surface-modified hydrophilic materials (e.g. nylon, polyamide, and polyethersulfone).

In some embodiments a sensor may be a visual sensor to monitor, for example, plant color, plant size, plant shape, plant density, and plant growth. The visual sensor, which can be a visual, infrared, or hyperspectral camera, can take still images and/or video in low and/or high resolution.

In other embodiments a sensor may measure, for example but not limited to: humidity, $CO_2$, lux, PAR, vapor pressure deficit, heat index, water pH, soil moisture, volumetric soil moisture content, soil pH, accelerometer, temperature, pressure, gas sensing, such as ammonia and methane, GPS, UWB trilateration, parametric sensing, CO, oxygen, total volatile organic compounds, chemical, contaminants, conductivity, resistivity, current sensing/measuring, electrical activity, metal detecting, evapotranspiration, water usage, salinity, pest control, climate monitoring, stem diameters, radiation, rain, snow, wind, lightning, soil nutrients, dew point, leaf wetness, occupancy, position/status, smoke, fluid leaks, power failure, total dissolved solids, flood, motion, door/window motion, photogate, touch, Haptic, displacement, level, acoustic/sound/vibration/frequency, air flow, Hall effect, fuel level, fluid level, lidar, radar, torque, speed, tire pressure, chemicals, infrared, ozone, magnetic, radio direction finder, air pollution, moisture detection, seismometer, airspeed, depth, altimeter, freefall, position, angular rate, shock, tilt, velocity, inertial, force, stress, strain, weight, flame, proximity/presence, stretch, heartbeat, heart rate, blood glucose, blood oxygen, insulin, body temperature, medical chemical detection, blood pressure, sleep monitoring, respiration rate, lactic acid, hydration, cholesterol, electrocardiogram, electroencephalogram, electromyogram, hemoglobin, and anemia.

An energy harvester may be a photovoltaic, piezoelectric, vibrational, thermoelectric, radio frequency (RF), and/or inductive energy harvester. Photovoltaic energy harvesters may include organic photovoltaic (OPV) cells, perovskites, gallium arsenide (GaAs), copper indium gallium selenide (CIGS), cadmium telluride (CdTe), amorphous silicon, crystalline silicon, and polycrystalline silicon. In some embodiments, the photovoltaic energy harvesters may be flexible. In other embodiments, the photovoltaic energy harvesters may be rigid.

In some embodiments, OPV cells or silicon may be used for energy harvesting given their inherent superior indoor light energy harvesting, which may enable the modular sensor system to work in all light environments. In embodiments where photovoltaic energy harvesters are used, these may be optimized for any light spectrum, such as sunlight or artificial light (e.g., LED, fluorescent, incandescent, grow lights, neon lights, mercury vapor, metal halide, high-intensity discharge, bioluminescent, chemiluminescent), to increase the energy harvesting from solar for a target spectrum. For example, for a given light spectrum, the optimization could target a specific level of light, ranging from 1 lux to 150,000 lux. In other embodiments, the optimization could target 100 lux to 1,000 lux for indoor applications, 100 lux to 75,000 lux for indoor agriculture applications (e.g., 5,000 lux to 7,000 lux for seedlings and 15,000 lux to 75,000 lux for vegetative growth), 1,000 lux to 30,000 lux for cloudy outside applications, and 100,000 lux to 140,000 lux for bright sunlight applications.

In some embodiments, the photovoltaic energy harvester may be optimized for indoor light, ensuring that whether modular sensor system 100 is indoors or outdoors, there will be enough light to power modular sensor system 100 even if the photovoltaic energy harvester is not optimized for outdoor light.

In some embodiments, optimizing the photovoltaic energy harvester may involve changing layers structure, changing layers thickness, and/or adding layers. For example, the photovoltaic energy harvester may be highly tunable to the light spectrum in varying applications. Internally, color and transparency of the photovoltaic energy harvester may be tuned by increasing or decreasing device layer thicknesses, choosing photoactive materials based on their spectral absorption properties, varying the ratio of photoactive materials, and adding or removing layers. Externally, the photovoltaic energy harvester may be tuned to a specific light spectrum using anti-reflective coatings, distributed Bragg reflectors, micro-patterning, and other light-trapping structures. In some embodiments, the photovoltaic energy harvester may be engineered such that its absorption spectrum may accept the emission spectrum of the light source. This may be tuned by varying the bandgap of an individual sub-cell (e.g., one of the junctions of the photovoltaic energy harvester), or by adding multiple junctions such that the combined absorption spectrum of the photovoltaic energy harvester is matched to the light source—thereby increasing the efficiency of the photovoltaic energy harvester. For example, in inorganic photovoltaic cells, elements may be added to the base photovoltaic cell (e.g., adding N to GaAs) to adjust the bandgap.

An energy storage device may be a battery, rechargeable battery, capacitor, and/or super-capacitor.

In some embodiments, the wireless radios are configured for one or more of Bluetooth, Bluetooth Low Energy (BLE), BLE mesh, Long-Term Evolution (LTE), Wireless-Fidelity (Wi-Fi), Worldwide Interoperability for Microwave Access (WiMAX), WiFi-ah, WiFi HaLow, 802.11, 802.11a, 802.11b, 802.11g, Long Range (LoRa), Long Range Wide Area Network (LoRaWAN), Low Power Wide Area Networks (LPWANs), Zonal Intercommunication Global-standard (ZigBee), Z-Wave, 6LowPAN, Thread, Ultra-wideband (UWB), Infrared (IR), Infrared Data Association (IrDA), Narrowband Internet of Things (NB-IoT), Near Field Communication (NFC), radio frequency (RF), radio frequency identification (RFID), SigFox, Ingenu, Weightless-N, Weightless-P, Weightless-W, Advanced Network Technology (ANT), ANT+, DigiMesh, MiWi, EnOcean, Dash7, WirelessHART, General Packet Radio Service (GPRS), Global Systems for Mobile Communications (GSM), Extended Coverage Global Systems for Mobile Communications (EC-GSM), MYTHINGS, Metering Bus (M-bus), Konnex (KNX), and Industrial, Scientific, and Medical band (ISM-band) radios. Different radios may be used for different applications. For example, some radios which have a shorter range and require lower power may be used indoors (e.g., BLE) where the signal range does not have to be long, while others which have a longer range and require more power may be used outdoors (e.g., LoRa radio for farms, or LTE for moving vehicles).

An electronics device may include one or more of batteries, supercapacitors, onboard processors such as Central Processing Units (CPUs) and Graphics Processing Units (GPUs), thermoelectric devices, light-emitting devices, LEDs, power management chips, logic circuits, microprocessors, microcontrollers, integrated circuits, fans, resistors, capacitors, transistors, inductors, diodes, semiconductors, optoelectronic devices, memristors, micro-electromechanical systems (MEMS) devices, varistors, antennas, transducers, crystals, resonators, terminals, optical detectors, optical emitters, heaters, circuit breakers, fuses, relays, spark gaps, heat sinks, motors, displays, liquid crystal displays (LCD), light-emitting diode displays (LED), microLED, electroluminescent displays (ELD), electrophoretic displays (EPD), active matrix organic light-emitting diode displays (AMO-LED), organic light-emitting diode displays (OLED), quantum dot displays (QD), quantum light-emitting diode displays (QLED), vacuum florescent displays (VFD), digital light processing displays (DLP), interferometric modulator displays (IMOD), digital microshutter displays (DMS), plasma displays, neon displays, filament displays, surface-conduction electron-emitter displays (SED), field emission displays (FED), Laser TV, carbon nanotube displays, touch screens, external connectors, data storage, piezo devices, speakers, microphones, security chips, and user input controls including buttons, knobs, sliders, switches, joysticks, directional-pads, keypads, and pressure/touch sensors.

Figure 2A:
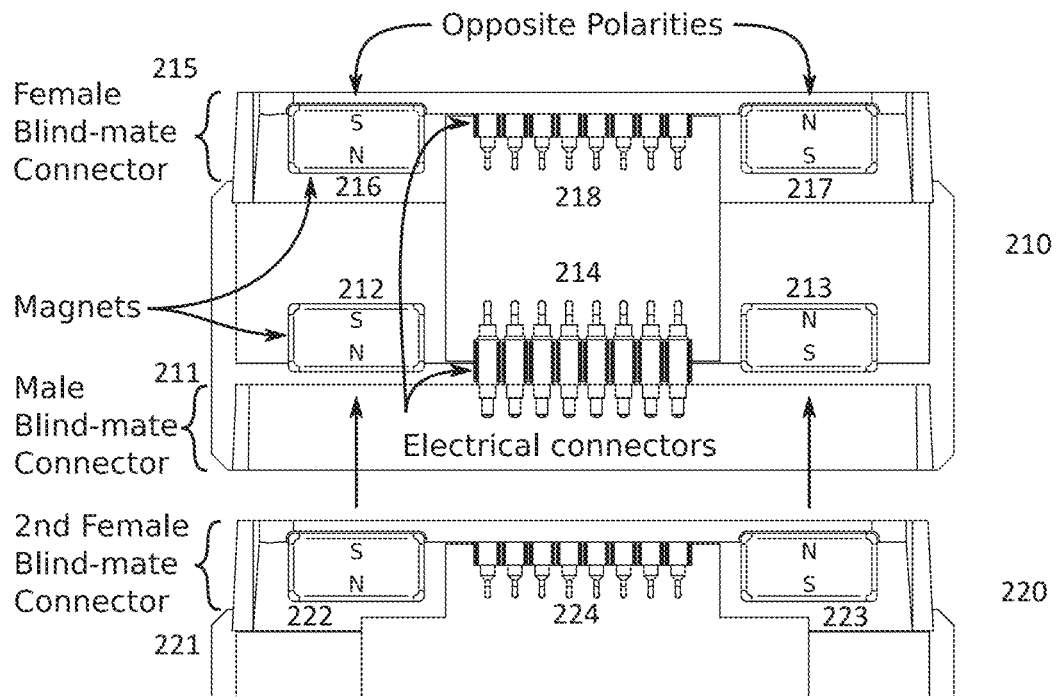
FIGS. 2A and 2B are illustrations of an exemplary attaching mechanism between modules of an exemplary modular sensor system.
Figure 2B:
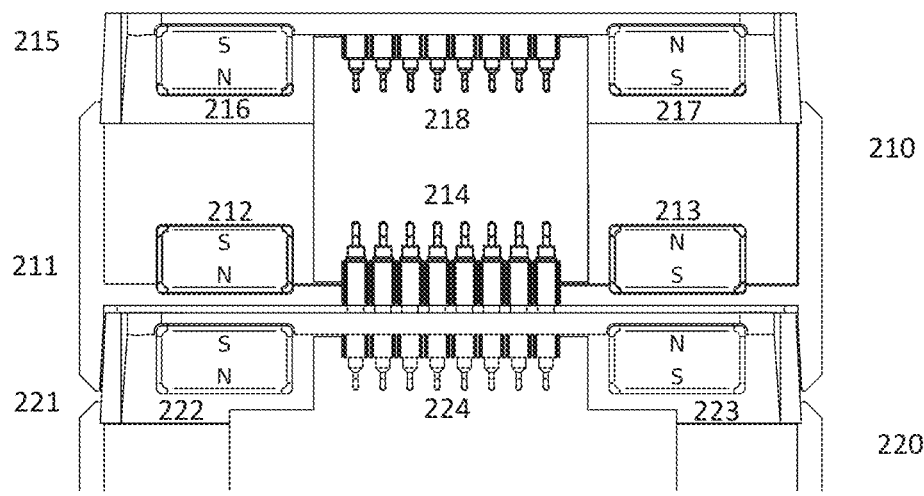

FIGS. 2A and 2B are illustrations of an exemplary attaching mechanism between modules of modular sensor system 100. FIG. 2A depicts two detached modules, a first module 210 and a second module 220, ready to be attached. As shown in this example, first module 210 may include a male blind-mate connector 211, which includes two magnets 212 and 213 and male electrical connectors 214, and a first female blind-mate connector 215, which includes two magnets 216 and 217 and first female electrical connectors 218. Further, second module 220 may include a second female blind-mate connector 221, which includes two magnets 222 and 223 and second female electrical connectors 224.

The polarization of magnet pairs 212 and 213, 216 and 217, and 222 and 223 may be opposite polarities such that they repel another magnet pair when two modules are being attached with an incorrect alignment. For example, magnet 212 has its north pole facing outwards and magnet 213 has its south pole facing outwards. If an attempt were made to attach second module 220 to first module 210 as depicted (i.e., magnet 222 attaches to magnet 212 and magnet 223 attaches to magnet 213), the connection attempt would be successful, as the north and south poles of each attaching magnet attract. However, if second module 220 were flipped (i.e., magnet 222 attaches to magnet 213 and magnet 223 attaches to magnet 212), the magnets would provide a resistive force preventing a user from connecting first module 210 and second module 220 in the wrong orientation, and the connection attempt would fail. This may be useful if a specific orientation is beneficial to the functionality of modular sensor system 100.

FIG. 2B depicts first module 210 and second module 220 after being attached. Here, electrical connectors 214 and 224 form a connection such that power and/or data may be transmitted between first module 210 and second module 220. An electrical connector may be any of a plurality of connectors, such as but not limited to spring-loaded (pogo pin) connectors, audio connectors, video connectors, banana connectors, direct current (DC) connectors, Deutsches Institut für Normung (DIN) connectors, Dock connectors, D-sub connectors, edge connectors, Japan Solderless Terminal (JST) connectors, mini-din connectors, optical fiber connectors, phone connectors, pin headers, Radio Corporation of America (RCA) connectors, registered jack (RJ-XX) connectors, Universal Serial Bus (USB) connectors, USB-C connectors, micro USB connectors, circular connectors, hybrid connectors, crown spring connectors, modular jack connectors, connectors using a Secure Digital (SD) card port, connectors using a microSD card port, and an attaching mechanism of the blind-mate connector.

In some embodiments, a module may include only one blind-mate connector and serve as an end cap module. Meanwhile, modules which include two or more blind-mate connectors allow additional modular expansion for a potentially unlimited number of modules to be connected.

In other embodiments, the attaching mechanism may include mechanical clips, screwing, snapping, binding posts, adhesives, press fits, friction fits, screw locking, toggle connectors, bayonet connectors, and banana connectors. In yet other embodiments, the attaching mechanism may serve as the electrical connector.

Figure 3A:
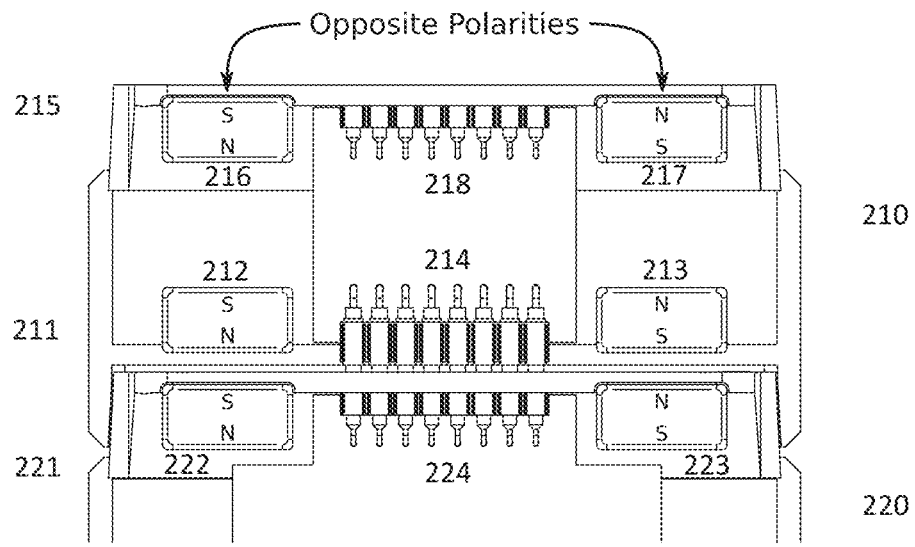
FIGS. 3A and 3B illustrate a rear mounting system for a modular sensor system having magnets with opposite polarities.
Figure 3B:
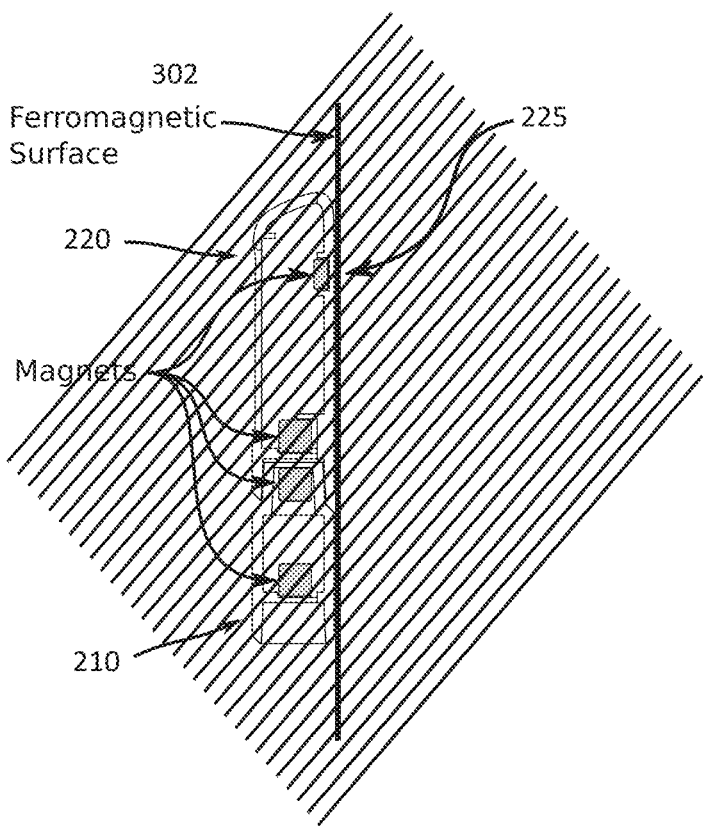

FIGS. 3A and 3B illustrate a rear mounting system for a modular sensor system having magnets with opposite polarities. FIG. 3A depicts the system of FIG. 2B, i.e., a modular sensor system with a first module 210 attached to a second module 220 via magnets 212, 213, 222, and 223, and with an established electrical connection via electrical connectors 214 and 224.

FIG. 3B illustrates how this system may be mounted on to a ferromagnetic surface. In this case, since the surface is ferromagnetic, all magnetic orientations may be used to mount the modular sensor system onto ferromagnetic surface 302. Further, second module 220 is shown to be an end cap module with only one blind-mate connector 221 and an optional rear magnet 225. Rear magnet 225 and other additional magnets may be disposed in and/or on the modules (but outside of any blind-mate connectors) to increase the strength of rear magnetic mounting.

Figure 4A:
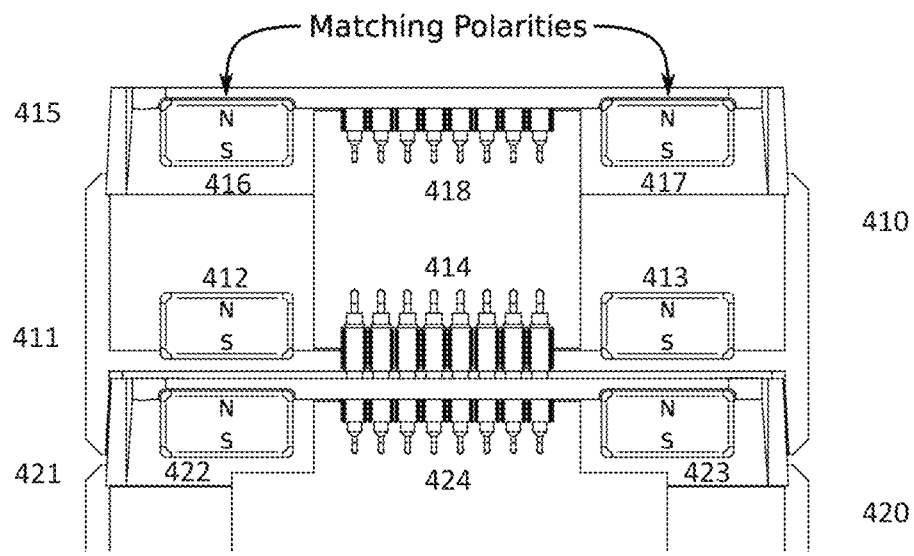
FIGS. 4A and 4B illustrate a rear mounting system for a modular sensor system having magnets with matching polarities.
Figure 4B:
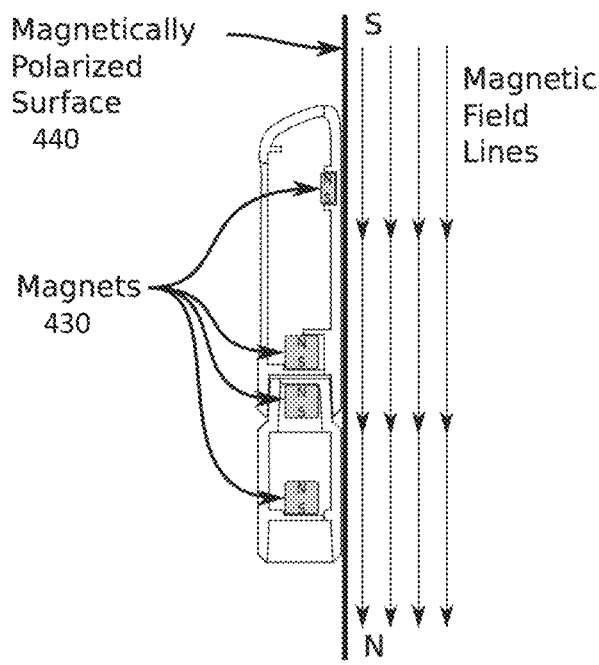

FIGS. 4A and 4B illustrate a rear mounting system for a modular sensor system having magnets with matching polarities. FIG. 4A depicts a system similar to that of FIG. 3A, with the notable difference being that the magnet pairs (i.e., 412 and 413, 416 and 417, and 422 and 423) have matching polarities. This would allow the system to attach modules in any orientation.

Further, referring now to FIG. 4B, the matching polarities would also allow the magnets to act as a rear magnetic mount to both ferromagnetic surfaces and magnetically polarized objects, as long as the magnets are aligned correctly. For example, if magnetically polarized surface 440 has a polarization as shown in FIG. 4B (i.e. going south to north from top to bottom) magnets 430 may be disposed as shown (i.e., going north to south from top to bottom) in order to be mounted successfully.

Figure 5A:
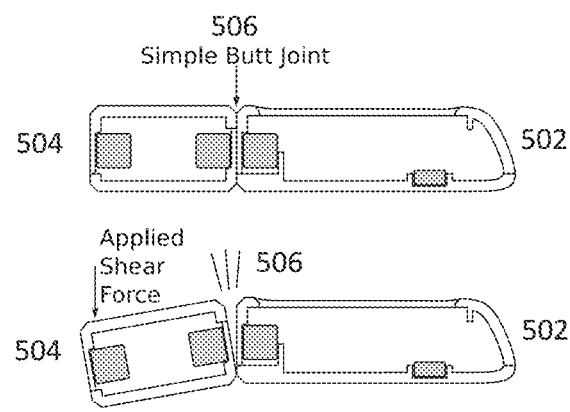
FIGS. 5A and 5B illustrate the results of applying a sideways shear force to various butt joints.
Figure 5B:
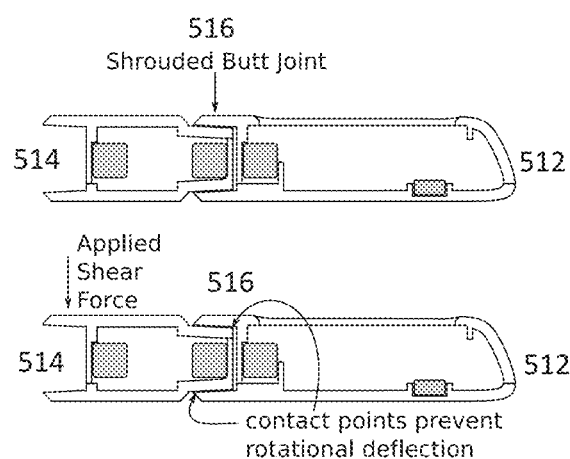

FIGS. 5A and 5B illustrate the results of applying a sideways shear force to a simple butt joint and a shrouded butt joint, respectively, when employed with the attaching mechanism described above. FIG. 5A illustrates how a simple butt joint 506 may not be able to handle a sideways shear force 508 being applied to module 504, which may become detached from end cap module 502 as a result. This may occur because the magnets mainly prevent the modules from being pulled apart, but there is no force acting against the direction of applied sideways shear force 508, therefore, module 504 may not be able to stay in place.

However, with the addition of a shrouded butt joint 516, as shown in FIG. 5B, the system becomes more resilient and module 514 may not become detached when a sideways shear force 518 is applied. This may occur because the contact points of shrouded butt joint 516 apply an equal and opposite force to applied sideways shear force 518 to prevent rotational deflection and keep the connection with end cap module 512 in place. This allows the physical connection to be much stronger and it may be harder to disconnect the modules, which must be pulled apart with enough force to overcome the magnetic attraction.

In some embodiments, the shroud may include either the male electrical connector or the female electrical connector.

Figure 6:
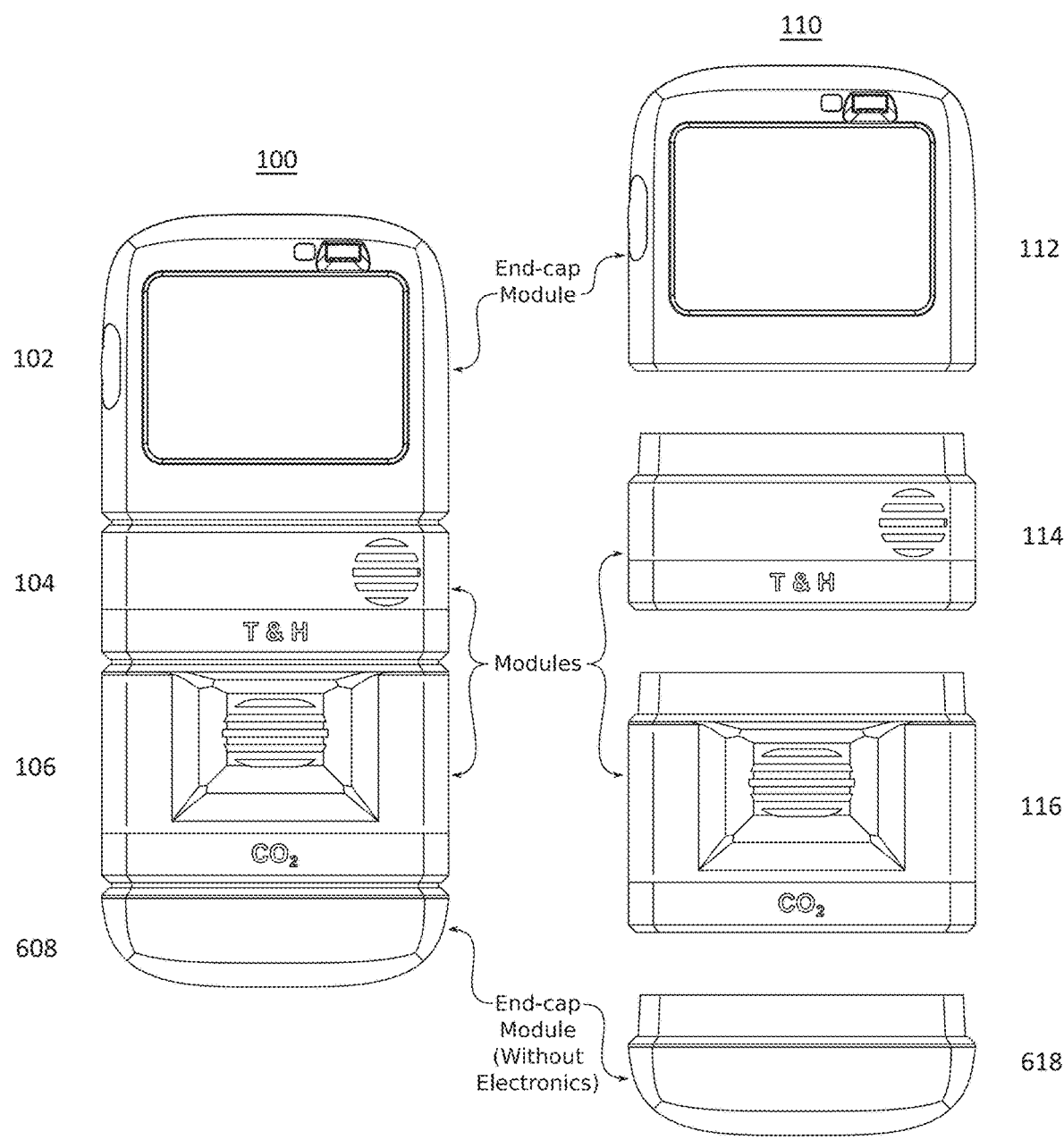
FIG. 6 is an illustration depicting an assembled view and an exploded view of an exemplary modular sensor system with two end cap modules.

FIG. 6 is an illustration depicting an assembled view and an exploded view of an exemplary modular sensor system with an end cap module devoid of electronics. In some embodiments, an end cap is devoid of electronics, and in other embodiments an end cap serves as a stand-alone charger for the modular sensor system. For example, as shown in FIG. 6, modular sensor system 100 (or exploded modular sensor system 110) may include an electronics-free end cap module 608 (or electronics-free end cap module 618) with no electronics which functions only to protect the mating blind-mate connector (i.e., the exposed blind-mate connector of $CO_2$ module 106 or 116) and its electrical connector from water moisture and physical damage.

In some embodiments, end cap modules (i.e., end cap module 102 and electronics-free end cap module 608) may serve to prevent water ingress and avoid potential mechanical damage to an exposed electrical connector as a result. End cap modules (e.g., end cap module 102 and electronics-free end cap module 608) and other modules (e.g., temperature and humidity module 104 and $CO_2$ module 106) may be designed to be water resistant and/or waterproof. For example, end cap module 102 may contain a photovoltaic energy harvester, a rechargeable battery, a printed circuit board assembly (PCBA), and sensors that do not need to be opened to the air (e.g., temperature and lux/PAR sensors) such that end cap module 102 may be made waterproof.

In some embodiments, end cap 608 or 618 contains electronics and serves as a stand-alone charger for the modular sensor system containing either a power cord or an electrical connector for power. The electrical connector can comprise one or more of banana connectors, barrel connectors, blade connectors, direct current (DC) connectors, Deutsches Institut für Normung (DIN) connectors, Dock connectors, D-sub connectors, edge connectors, Japan Solderless Terminal (JST) connectors, mini-din connectors, optical fiber connectors, phone connectors, pin headers, Radio Corporation of America (RCA) connectors, registered jack (RJ-XX) connectors, Universal Serial Bus (USB) connectors, USB-C connectors, micro USB connectors, circular connectors, rectangular connectors, hybrid connectors, crown spring connectors, and modular jack connectors.

Figure 7A:
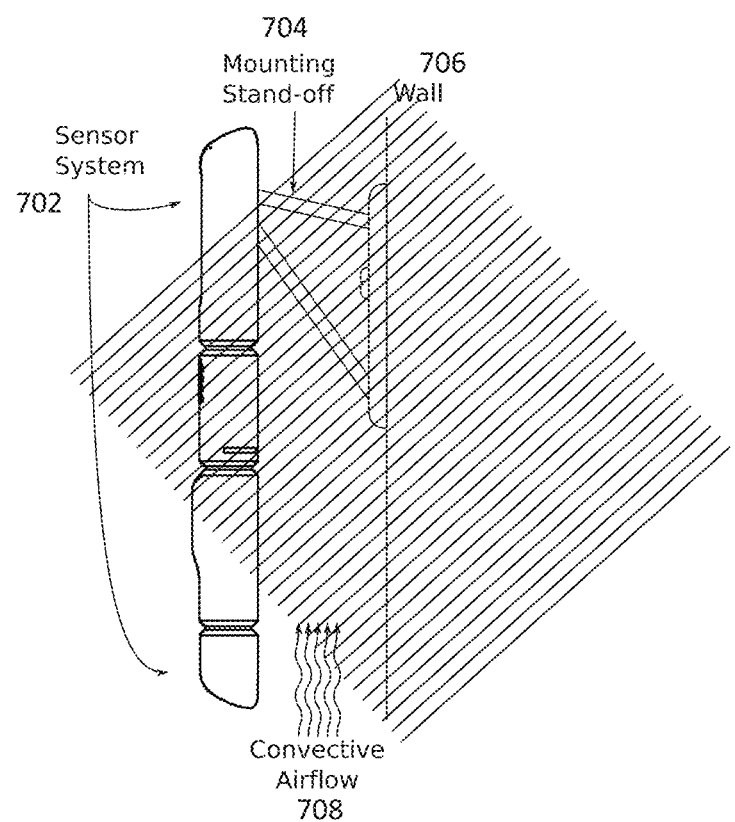
FIGS. 7A-C illustrate different techniques for mitigating the effect of sunlight and other bright lights to promote accurate temperature readings by a temperature sensor.
Figure 7B:
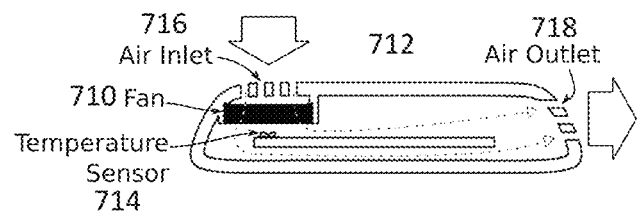
Figure 7C:
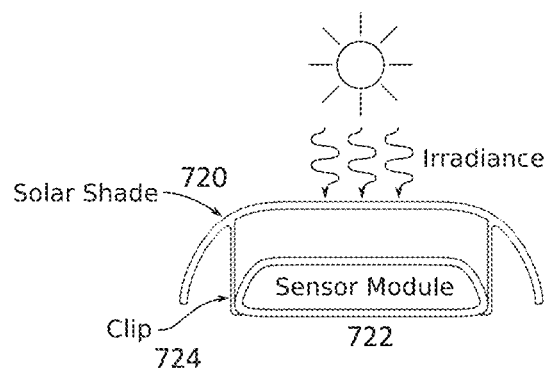

FIGS. 7A-C illustrate different techniques to promote (1) accurate temperature readings by a temperature sensor by mitigating the effect of heating from sunlight and other bright lights and/or (2) accurate air temperature readings when adhering the modules to a wall or other surface. For example, in FIG. 7A modular sensor system 702 may be placed on a stand-off 704 to minimize the thermal transfer of heat between the mounting surface (i.e., wall 706) and the temperature sensor (not shown) in modular sensor system 702. Convective airflow 708 may also help mitigate the thermal transfer of heat between wall 706 and modular sensor system 702.

FIG. 7B depicts a fan 710 housed within temperature module 712 which may be used to promote airflow over temperature sensor 714 under high light levels by suctioning air through air inlet 716 and expelling air through air outlet 718. It should be noted that while fan 710 may use a lot of power, it may only be required to function while under a high light level when a photovoltaic energy harvester may generate sufficient power to operate fan 710 and all other electronics successfully. Furthermore, temperature sensor 714 is placed on a printed circuit board stalk 715 to minimize thermal transfer of heat between the temperature sensor and the bulk of printed circuit board 719.

FIG. 7C depicts a solar shade 720 being placed over temperature module 722 (or only over the entire modular sensor system) and attached to temperature module 722 by means of a clip 724 so that temperature module 722 is not in direct sunlight or other bright lights.

Figure 8:
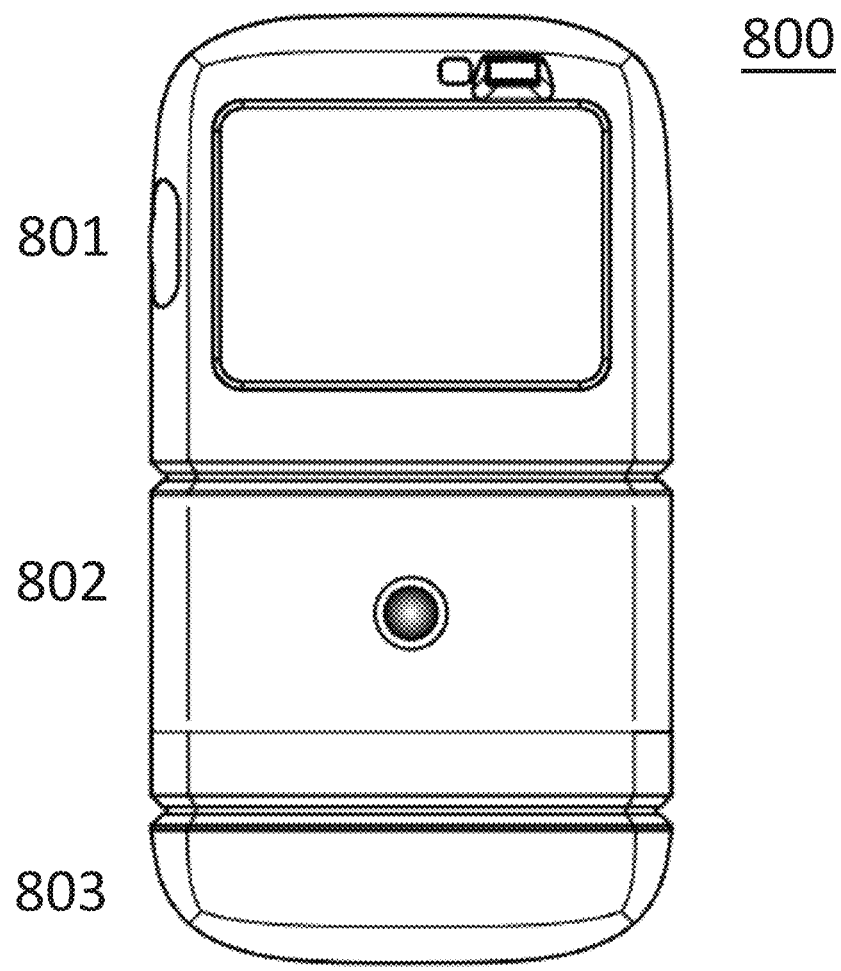
FIG. 8 illustrates an assembled view of an OPV-powered energy harvesting sensor hub attached to a camera module.

FIG. 8 illustrates an assembled view of modular sensor system 800 including an OPV-powered energy harvesting sensor hub 801, a camera 802, and an end cap module 803. The sensor hub 801 can serve as an energy source for any attached electronic device. This will create an energy source for any application that desires increased power, particularly under indoor or low light levels. In certain embodiments, the 802 captures still images in low resolution, still images in high resolution, video images in low resolutions and/or video images in high resolution. In other embodiments, the end cap module 803 may also include energy harvesters, such as a photovoltaic cell, energy storage devices, such as rechargeable batteries, wireless radios, electronics devices, such as power management circuitry, a microprocessor, LEDs, and/or push buttons, and/or electronics to serve as a stand-alone charger for the modular sensor system.

Figure 9:
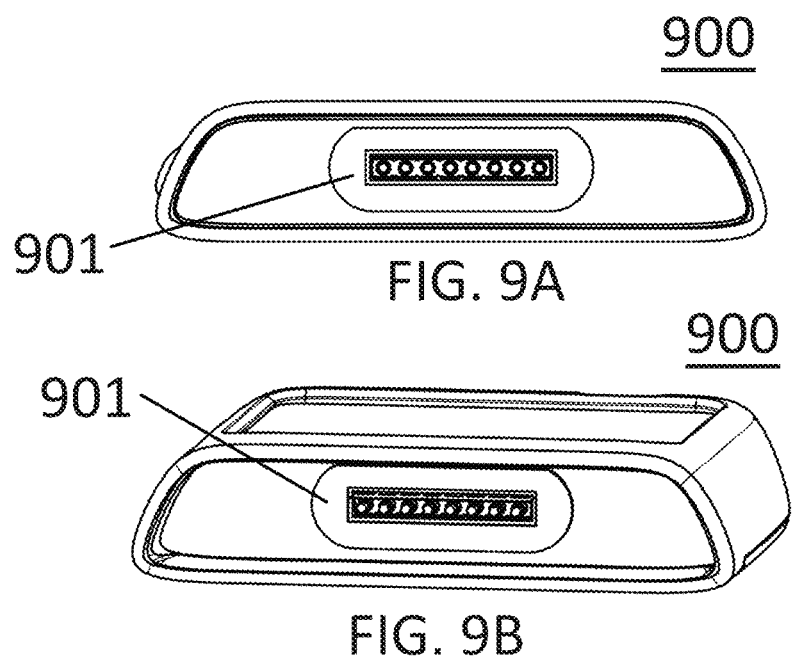
FIGS. 9A-B illustrate additional views of a connector for the modular sensor system disclosed herein.

FIGS. 9A-B illustrate additional views of an end cap 900 for the modular sensor system disclosed herein comprising a plurality of electrical connectors 901. The electrical connector 901 provides data and/or power signals to attached modules. In certain embodiments, the electrical connector comprises positive and negative terminals in order to supply power to the sensor system. In some embodiments, the end cap serves as a stand-alone charger for the modular sensor system.

Figure 10:
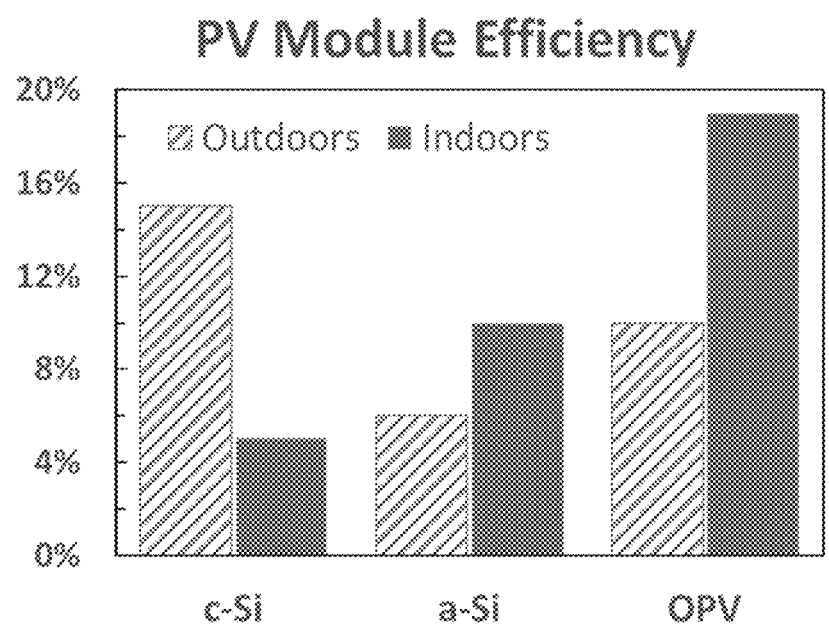
FIG. 10 illustrates photovoltaic module efficiency for an OPV powered energy harvesting device according to the present disclosure compared to a crystalline Si (c-Si) and amorphous Si (a-Si) powered device, as shown in indoor lighting.

FIG. 10 illustrates photovoltaic module efficiency for an OPV powered energy harvesting device according to the present disclosure compared to a crystalline Si (c-Si) and amorphous Si (a-Si) powered devices, as shown in indoor lighting, specifically 500 lux LED light. In this comparison, all three devices were exposed to 500 lux LED light. The OPV device, which was comprised of a CPB:$C_{70}$ cell, had a Power Conversion Efficiency of 17.9% based on an input power of 0.163 mW/cm$^2$, a output power of 0.0292 mW/cm$^2$, a voltage at maximum power of 0.62V and a current density at maximum power of 0.0471 mA/cm$^2$. By comparison, an a-Si powered device had a Power Conversion Efficiency of 10.3% based on an input power of 0.168 mW/cm$^2$, an output power of 0.0173 mW/cm$^2$, a voltage at maximum power of 2.9V and a current density at maximum power of 0.0060 mA/cm$^2$. Under the same conditions, a c-Si powered device had a Power Conversion Efficiency of 5.3% based on an input power of 0.168 mW/cm$^2$, an output power of 0.00869 mW/cm$^2$, a voltage at maximum power of 1.94V, and a current density at maximum power of 0.00448 mA/cm$^2$.

Figure 11A:
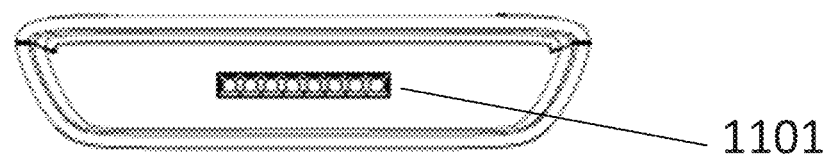
FIGS. 11A-D illustrate an end cap module with electronics to serve as a stand-alone charger for the modular system.
Figure 11B:
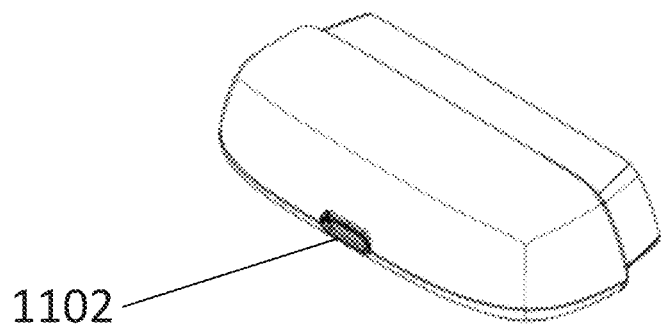
Figure 11C:
Figure 11D:
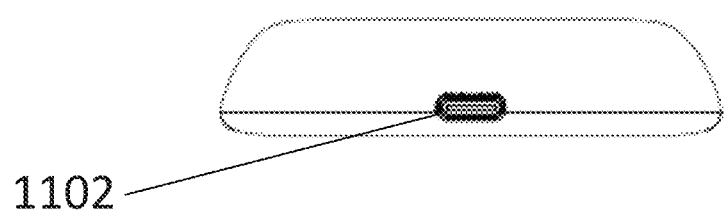

FIGS. 11A-D illustrate end cap modules with electronics to serve as a stand-alone charger for the modular system. FIG. 11A depicts a connector 1101 attaching to the modular sensor system, including pins for data and/or power signals. FIGS. 11B-D depict three different views of an end cap module comprising a USB-C port 1102 to which power can be provided for charging the modular sensor system.

What is claimed is:
1. A modular sensor system comprising:
a plurality of modules, the plurality of modules comprising one or more sensors, wherein at least one of the modules contain one or more high-power sensors or electronics, one or more energy harvesters, one or more energy storage devices, one or more wireless radios, and one or more electronics devices, wherein the one or more energy harvesters comprise a organic photovoltaic (OPV) modules, the OPV modules being optimizable for any light spectrum;

one or more blind-mate connectors contained within each of the plurality of modules, the one or more blind-mate connectors comprising an electrical connector to transmit power and/or data and configured to connect two modules of the plurality of modules together.

2. The module sensor system of claim 1 comprising one or more high-powered sensors chosen from visual sensors, chemical sensors, and gas sensors.

3. The modular sensor system of claim 2 comprising one or more visual sensors chosen from visual cameras, infrared cameras, and hyperspectral sensors.

4. The modular sensor system of claim 2 comprising one or more gas sensors chosen from ammonia sensors and methane sensors.

5. The modular sensor system of claim 2 comprising one or more visual sensors chosen from visual cameras, infrared cameras, and hyperspectral sensors, and one or more gas sensors chosen from ammonia sensors and methane sensors.

6. The modular sensor system of claim 1, wherein the one or more high-powered electronics are chosen from microcontrollers and onboard processors, such as Central Processing Units (CPUs) and Graphics Processing Units (GPUs).

7. The modular sensor system of claim 1, wherein the one or more energy harvesters are chosen from photovoltaic harvesters, piezoelectric harvesters, vibrational harvesters, thermoelectric harvesters, radio frequency (RF) harvesters, and inductive energy harvesters.

8. The modular sensor system of claim 1, wherein the one or more energy storage devices comprise one or more of batteries, capacitors, and super-capacitors.

9. The modular sensor system of claim 1, wherein the one or more blind-mate connectors attach the plurality of modules together utilizing at least one attaching mechanism chosen from magnets, mechanical clips, screwing, snapping, binding posts, adhesives, press fits, friction fits, screw locking, toggle connectors, bayonet connectors, banana connectors, and combinations thereof.

10. The modular sensor system of claim 9, wherein the attaching mechanism is the electrical connector.

11. The modular sensor system of claim 9, wherein the attaching mechanism comprises at least one pair of magnets, and a polarity of the at least one pair of magnets is reversed such that each module of the plurality of modules is connected in a correct orientation.

12. The modular sensor system of claim 9, wherein the attaching mechanism comprises at least one magnet as a rear magnetic mount such that all magnetic orientations work for ferromagnetic surfaces.

13. The modular sensor system of claim 9, wherein the attaching mechanism comprises at least one pair of magnets, and a polarity of the at least one pair of magnets is matching, allowing the at least one pair of magnets to serve as a rear magnetic mount to magnetically polarized objects and ferromagnetic surfaces.

14. The modular sensor system of claim 1, wherein the one or more blind-mate connectors comprise a shroud to prevent a sideways shear force from severing a connection between two modules from the plurality of modules.

15. The modular sensor system of claim 1, wherein a module of the plurality of modules is an end cap module, the end cap module being disposed on one end of the modular sensor system and preventing water ingress.

16. The modular sensor system of claim 1, wherein each of the plurality of modules comprises a pass-through for data, power, or both data and power to travel between modules.

17. The modular sensor system of claim 1, wherein the one or more electronics devices comprise one or more of batteries, supercapacitors, thermoelectric devices, light emitting devices, LEDs, power management chips, logic circuits, microprocessors, microcontrollers, integrated circuits, fans, resistors, capacitors, transistors, inductors, diodes, semiconductors, optoelectronic devices, memristors, microelectromechanical systems (MEMS) devices, varistors, antennas, transducers, crystals, resonators, terminals, optical detectors, optical emitters, heaters, circuit breakers, fuses, relays, spark gaps, heat sinks, motors, displays, liquid crystal displays (LCD), light-emitting diode displays (LED), microLED, electroluminescent displays (ELD), electrophoretic displays (EPD), active matrix organic light-emitting diode displays (AMOLED), organic light-emitting diode displays (OLEO), quantum dot displays (QD), quantum light-emitting diode displays (QLED), vacuum fluorescent displays (VFD), digital light processing displays (OLP), interferometric modulator displays (IMOD), digital microshutter displays (OMS), plasma displays, neon displays, filament displays, surface-conduction electron-emitter displays (SEO), field emission displays (FED), Laser TV, carbon nanotube displays, touch screens, external connectors, data storage, piezo devices, speakers, microphones, security chips, and user input controls including buttons, knobs, sliders, switches, joysticks, directional-pads, keypads, and pressure/touch sensors.

18. The modular sensor system of claim 1, wherein the one or more wireless radios are configured for one or more of Bluetooth, Bluetooth Low Energy (BLE), BLE mesh, Long-Term Evolution (LTE), Wireless-Fidelity (Wi-Fi), Worldwide Interoperability for Microwave Access (WiMAX), WiFi-ah, WiFi Ha Low, 802.11, 802.11 a, 802.11 b, 802.11 g, Long Range (Lo Ra), Long Range Wide Area Network (LoRaWAN), Low Power Wide Area Networks (LPWANs), Zonal Intercommunication Global-standard (ZigBee), Z-Wave, 6LowPAN, Thread, Ultra-wideband (UWB), Infrared (IR), Infrared Data Association (IrDA), Narrowband Internet of Things (NB-IoT), Near Field Communication (NFC), radio frequency (RF), radio frequency identification (RFID), SigFox, Ingenu, Weightless-N, Weightless-P, Weightless-W, Advanced Network Technology (ANT), ANT+, DigiMesh, MiWi, EnOcean, Dash7, WirelessHART, General Packet Radio Service (GPRS), Global Systems for Mobile Communications (GSM), Extended Coverage Global Systems for Mobile Communications (EC-GSM), MYTHINGS, Metering Bus (M-bus), Konnex (KNX), and Industrial, Scientific, and Medical band (ISM-band) radios.

19. The modular sensor system of claim 1, wherein the OPV modules are optimized for a light spectrum by increasing or decreasing device layer thickness, choosing photoactive materials based on their spectral absorption properties, varying the ratio of photoactive materials, adding or removing layers and junctions, varying the bandgap of an individual junction, and applying one or more of anti-reflective coatings, distributed Bragg reflectors, micro-patterning, and/or light-trapping structures.

20. The modular sensory system of claim 1, wherein the OPV modules are optimized for indoor light.

21. The modular sensor system of claim 1, wherein the camera is chosen from at least one of a low-resolution camera producing still images, a low-resolution camera producing video, a high-resolution camera producing still images and a high-resolution camera producing video.

22. The modular sensor system of claim 21, wherein at least one of the wireless radios is configured to send the produced images and/or video to a wireless gateway.

\* \* \* \* \*